United States Patent
Marupaduga

(10) Patent No.: US 11,323,924 B1
(45) Date of Patent: May 3, 2022

(54) CONTROLLING INTRA-RAT HANDOVER UNDER FIRST RAT BASED ON SPECTRAL EFFICIENCY UNDER SECOND RAT

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 15 days.

(21) Appl. No.: 16/949,342

(22) Filed: Oct. 26, 2020

(51) Int. Cl.
*H04W 4/00* (2018.01)
*H04W 36/00* (2009.01)
*H04W 36/30* (2009.01)

(52) U.S. Cl.
CPC ... *H04W 36/0066* (2013.01); *H04W 36/0058* (2018.08); *H04W 36/0069* (2018.08); *H04W 36/0072* (2013.01); *H04W 36/0088* (2013.01); *H04W 36/30* (2013.01)

(58) Field of Classification Search
CPC ......... H04W 36/0055; H04W 36/0058; H04W 36/0066; H04W 36/0069; H04W 36/0072; H04W 36/0077; H04W 36/0085; H04W 36/0088; H04W 36/0094; H04W 36/30
See application file for complete search history.

(56) References Cited

U.S. PATENT DOCUMENTS

| | | | |
|---|---|---|---|
| 8,185,060 B2 | 5/2012 | Agashe et al. | |
| 8,285,321 B2 | 10/2012 | Ji et al. | |
| 9,392,515 B2 | 7/2016 | Wang et al. | |
| 9,699,800 B2 | 7/2017 | Himayat et al. | |
| 10,104,584 B2 | 10/2018 | Cai | |
| 10,141,983 B2 | 11/2018 | Kim et al. | |
| 10,237,735 B2 | 3/2019 | Kim et al. | |
| 10,292,140 B2 | 5/2019 | Nam et al. | |
| 10,314,055 B1 | 6/2019 | Marupaduga et al. | |
| 2015/0085800 A1 | 3/2015 | Sivanesan et al. | |
| 2016/0234714 A1 | 8/2016 | Basu Mallick et al. | |
| 2019/0098606 A1 | 3/2019 | Sharma et al. | |

OTHER PUBLICATIONS

Tariq Mumtaz, et al., "Dual Connectivity-Based Mobility Management and Data Split Mechanism in 4G/5G Cellular Networks," IEEE Access, vol. 8, May 20, 2020.

*Primary Examiner* — Matthew W Genack

(57) ABSTRACT

A method and system for controlling handover of a user equipment device (UE) in a system including RAT1 access nodes and RAT2 access nodes. An example method includes, while the UE is served with dual-connectivity cooperatively by a first RAT1 access node and a first RAT2 access node, (i) using a comparison between spectral efficiency of the first RAT2 access node and spectral efficiency of the second RAT2 access node as a basis to set a measurement threshold to be applied by the UE for evaluating coverage of a second RAT1 access node for possible handover of the UE from the first RAT1 access node to the second RAT1 access node, and (ii) causing the UE to apply the measurement threshold for evaluating the coverage of the second RAT1 access node for the possible handover of the UE from the first RAT1 access node to the second RAT1 access node.

20 Claims, 4 Drawing Sheets

CONTROLLING INTRA-RAT HANDOVER UNDER FIRST RAT BASED ON SPECTRAL EFFICIENCY UNDER SECOND RAT

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers, with the access node's coverage on each carrier defining a respective cell. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements respectively on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node (e.g., a threshold strong reference signal broadcast by the access node) on a particular carrier and could then engage in random-access and Radio Resource Control (RRC) signaling to establish an RRC connection through which the access node will serve the UE on that carrier. Further, if the UE is not already registered for service with the core network, the UE could transmit to the access node an attach request, which the access node could forward to a core-network controller for processing. And the core-network controller could then coordinate setup for the UE of one or more user-plane bearers extending between the UE and a core-network gateway that provides transport-network connectivity.

Once the UE is so connected and registered, the access node could then serve the UE in a connected mode on the carrier, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

For each such scheduled downlink or uplink communication on PRBs between an access node and a UE, the access node and UE could use a modulation and coding scheme (MCS) that is selected based on the UE's wireless channel quality, which the access node could specify in its scheduling directive to the UE.

In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or that supports more bits per resource element, and when channel quality is worse, the access node may direct use of a lower-order MCS that may have a lower coding rate and/or supports fewer bits per resource element.

Examples of modulation schemes include, without limitation, quadrature phase-shift keying (QPSK), in which each resource element represents 2 bits of data, 8 phase-shift keying (8PSK), in which each resource element represents 3 bits of data, 16 quadrature amplitude modulation (16QAM), in which each resource element represents 4 bits of data, 32QAM, in which each resource element represents 5 bits of data, 64QAM, in which each resource element represents 6 bits of data, and 256QAM, in which each resource element represents 8 bits of data.

In practice, the access node could determine the MCS to be used in a given instance based on wireless channel quality reported by the UE. For instance, as the access node serves the UE, the UE could transmit channel quality reports to the access node periodically and/or as part of the UE's scheduling requests or other communications to the access node, with each report including a channel-quality indicator (CQI) value representing the UE's determined channel quality and perhaps one or more other channel metrics such as downlink reference signal receive power (RSRP), signal-to-interference-plus-noise ratio (SINR), or the like. When the access node schedules communications to or from the UE, the access node could then map the UE's latest reported CQI value to a corresponding MCS value using a standard CQI-MCS mapping table, and the access node could direct use of that MCS in the scheduling directive that the access node sends to the UE. Communication could thus occur using that directed MCS.

In addition, in some implementations, if an access node supports service on multiple carriers, the access node might configure carrier-aggregation service for the UE, by adding one or more secondary carriers to the UE's connection with the access node and then serving the UE on the aggregate of those carriers. With carrier aggregation, one of the carriers, typically the one on which the UE initially connected with the access node, is deemed the UE's primary component carrier (PCC) or primary cell (PCell) and may be used for key signaling related to the UE's service, whereas each other carrier in the UE's connection is deemed a secondary component carrier (SCC) or secondary cell (SCell) of the UE's service, functioning mainly to provide the UE with increased aggregate bandwidth and higher associated peak-data rate for instance.

Further, when a UE is so connected with an access node, the UE could also regularly monitor coverage strength from the access node and from one or more other access nodes in the vicinity, to help ensure that the UE is served with the best available coverage. Applying defined measurement thresholds, for instance, if the UE detects that coverage strength from its serving access node is threshold weak and coverage strength from another access node is threshold strong (e.g., threshold stronger than coverage strength from its serving access node), then the UE could provide a measurement report to its serving access node, and the serving access node could responsively coordinate handover of the UE to the other access node.

As the industry advances from one generation of wireless technology to the next, or in other scenarios, networks and UEs may also support dual-connectivity service, where a UE is served on multiple co-existing connections, according to different respective RATs.

For instance, each of various cell sites in a network could include both a first access node configured to provide coverage and service according to a first RAT ("first-RAT access node") and a second access node configured to provide overlapping coverage and service according to a second RAT ("second-RAT access node"), and a UE positioned concurrently within coverage of both the first and second access nodes of such a cell site could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" (NSA) connectivity) could help facilitate increased peak data-rate of communications, by multiplexing the UE's communications across the multiple air-interface connections. Further or alternatively, dual connectivity may provide other benefits compared with serving a UE on a single connection (as "standalone" (SA) connectivity).

In a representative dual-connectivity implementation, the UE would be primarily connected under the first RAT. As such, the first-RAT access node could function as a master node (MN), responsible for coordinating setup, management, and teardown of dual-connectivity service for the UE and being as an anchor point for core-network control signaling and associated key RRC signaling related to the service of the UE. Whereas, the second-RAT access node access node could operate merely as a secondary node (SN) mainly to provide provided increased aggregate frequency bandwidth and associated increased peak data rate for the UE that is primarily connected with the first-RAT access node.

When a UE that supports dual-connectivity service enters into coverage of such a cell site, the UE could initially scan for first-RAT coverage and detect threshold strong coverage provided by the first-RAT access node on a given carrier, and the UE could then engage in signaling to establish a first-RAT connection between the UE and that first-RAT access node on that carrier as discussed above. Further, the first-RAT access node may also add one or more additional carriers to the UE's first-RAT connection to provide the UE with carrier-aggregation service as noted above.

In addition, perhaps having determined from profile data that the UE is dual-connectivity-capable, the UE's serving first-RAT access node, now acting as the UE's MN, could engage in a process to establish dual connectivity for the UE, adding secondary connectivity with the cell site's second-RAT access node, which would be an SN for the UE. For instance, the MN could engage in signaling with the core-network controller, with the SN, and with the UE, to establish a second-RAT connection between the UE and the SN on a carrier on which the SN access node operates. Further, this second-RAT connection with the SN could likewise be configured to encompass multiple carriers.

Further, in some dual-connectivity implementations, the MN could also engage in signaling to coordinate establishment of a split bearer for the UE, so that the MN and SN can concurrently serve the UE. For example, leveraging possibly high bandwidth that the SN can provide, the MN might engage in signaling with the core-network controller and the SN to arrange for transfer of an access bearer of the UE from extending between the core-network gateway and the MN to extending instead between the core-network gateway and the SN, and the MN might engage in signaling with the SN and with the UE to arrange for a bearer split at the SN, so that SN could then serve a portion of the UE's data communication while the MN serves another portion of the UE's data communication.

With these first-RAT and second-RAT connections and possible split bearer so established for the UE, the MN and SN could then serve the UE with packet-data communications on their respective connections with the UE, each in the manner discussed above, for instance with a portion of data flowing over the UE's first-RAT connection between the UE and the MN concurrently with another portion of the data flowing over the UE's second-RAT connection between the UE and the SN.

As noted above, however, the UE would be primarily connected under the first-RAT with the MN, and that primary connection would be important as an anchor for the UE's service. Therefore, while the UE is so dual-connected, the UE could also operate as noted above to monitor coverage strength from the MN as well as coverage strength from other first-RAT access nodes in the vicinity, to help ensure that the UE continues to have the best available anchor connection. In line with the discussion above, if the UE detects that coverage strength from its serving MN is threshold weak and coverage strength from another first-RAT access node is threshold strong (e.g., threshold stronger), the UE could report that fact to its serving MN, and the serving MN could hand the UE over to the other first-RAT access node.

Handover of a dual-connected UE from one first-RAT access node (i.e., source MN) to another (i.e., target MN) could involve tearing down the UE's existing dual connectivity, conducting the handover, and then newly establishing dual connectivity for the UE. For instance, the source MN could first de-configure the UE's dual connectivity by reversing the process that the MN engaged in to configure the dual connectivity—such as by engaging in signaling to undo a UE's split bearer and engaging in signaling to release the UE's second-RAT connection with the SN—thus returning the UE to standalone first-RAT connectivity. The MN could then process handover of the UE to the target MN, using standard handover signaling and processing. And once the UE thereby connects with the target MN, the target MN could then newly establish dual connectivity for the UE, adding for the UE a second-RAT connection with a new SN and possibly configuring a split bearer for the UE as discussed above.

Such handover of a UE is at its core an intra-RAT handover under the first RAT, namely, a handover of the UE from a first-RAT connection with the source MN to a first-RAT connection with the target MN. The respective second-RAT connections that these MNs coordinate for the UE to provide the UE with dual connectivity are merely secondary and are generally not the focus of the handover analysis. Generally at issue is, rather, the UE's coverage strength from the source MN versus the UE's coverage strength from the target MN.

The present disclosure stems from a recognition, however, that the level of service that a UE may be able to obtain from its secondary connection in dual connectivity could be important as well and, in some situations may be paramount. This may be the case especially if the secondary connection uses a newer and possibly technically-superior RAT than the primary connection, as dual-connectivity service in that context might rely on the secondary connection to carry a large portion of the UE's data communication. Given this, the present disclosure provides for basing intra-RAT handover of a UE under the first RAT on a consideration of service level that may be available to the UE under the second RAT.

One characteristic that could be of interest here is spectral efficiency under the second RAT. Spectral efficiency of a given system is a measure of the data rate that the system supports per unit of frequency spectrum, typically represented as a quantity of bits per second per Hertz (i.e., bits/s/Hz), with the data rate relating to the underlying baseband data being communicated and typically excluding overhead such as error-correction bits. In general, if UEs served by a system tend to have relatively good channel quality and/or if the system otherwise tends to serve the UEs with relatively high data rates per unit of frequency spectrum, the system would have relatively high spectral efficiency, which would represent a relatively desirable context for serving any given UE. Whereas, if UEs served by a system tend to have relatively poor channel quality and/or if the system otherwise tends serves UEs with relatively low data rates per unit of frequency spectrum, the system would have relatively low spectral efficiency, which would represent a less desirable (or a relatively undesirable) context for serving any given UE.

In accordance with the present disclosure, a computing system will perform a comparison of the spectral efficiency between second-RAT access nodes and will use the comparison as a basis to control handover of a UE under a first RAT. Namely the computing system apply this process in connection with contemplated handover of the UE from a source first-RAT access node, MN1, to a target first-RAT access node, MN2, in a scenario where the source first-RAT access node, MN1, has an associated second-RAT access node, SN1, and the target first-RAT access node, MN2, has an associated second-RAT access node, SN2. And in that context, the computing system could perform a comparison between spectral efficiency of SN1 and spectral efficiency of SN2, and the computing system could use that comparison as a basis to control handover of the UE between MN1 and MN2.

More particularly, the computing system could apply this process when the UE is served by with dual connectivity cooperatively by MN1 and SN1 and when the issue is whether the UE should be handed over from MN1 to MN2, where, upon carrying out of that handover to MN2, MN2 would then establish for the UE dual connectivity cooperatively provided by MN2 and SN2. In this context, the computing system could perform a comparison between (i) spectral efficiency of SN1 on the one or more carriers on which SN1 currently serves the UE and (ii) spectral efficiency of one or more carriers on which SN2 could serve the UE.

Based on this spectral efficiency comparison between SN1 and SN2, the computing system could control handover of the UE from MN1 to MN2 in various ways.

By way of example, the computing system could use the spectral efficiency comparison as a basis to adjust or otherwise set one or more measurement thresholds that MN1 would direct the UE to apply in evaluating the UE's coverage strength from MN1 and/or MN2.

For instance, if the spectral efficiency of SN1 is particularly high compared with the spectral efficiency of the one or more carriers of SN2, then the computing system may set one or more such measurement thresholds (or equivalently UE bias values to offset measurements) to a level that will deter handover of the UE from MN1 to MN2 and instead foster having the UE continue to be served by MN1 with the UE's existing dual connectivity. Whereas, if the spectral efficiency of SN1 is particularly low compared with the spectral efficiency of the one or more carriers of SN2, then the computing system may instead set one or more such measurement thresholds (or bias values) to a level that will foster handover of the UE from MN1 to MN2 and thus deter the UE from continuing to be served by MN1 with the UE's existing dual connectivity.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G LTE access node (e.g., 4G evolved Node-B (eNB)) functions as the MN, and a 5G NR access node (e.g., 5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE. Further, as the UE would be primarily connected under 4G LTE and just secondarily connected under 5G NR, handover of the UE would be between one 4G eNB and another 4G eNB.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
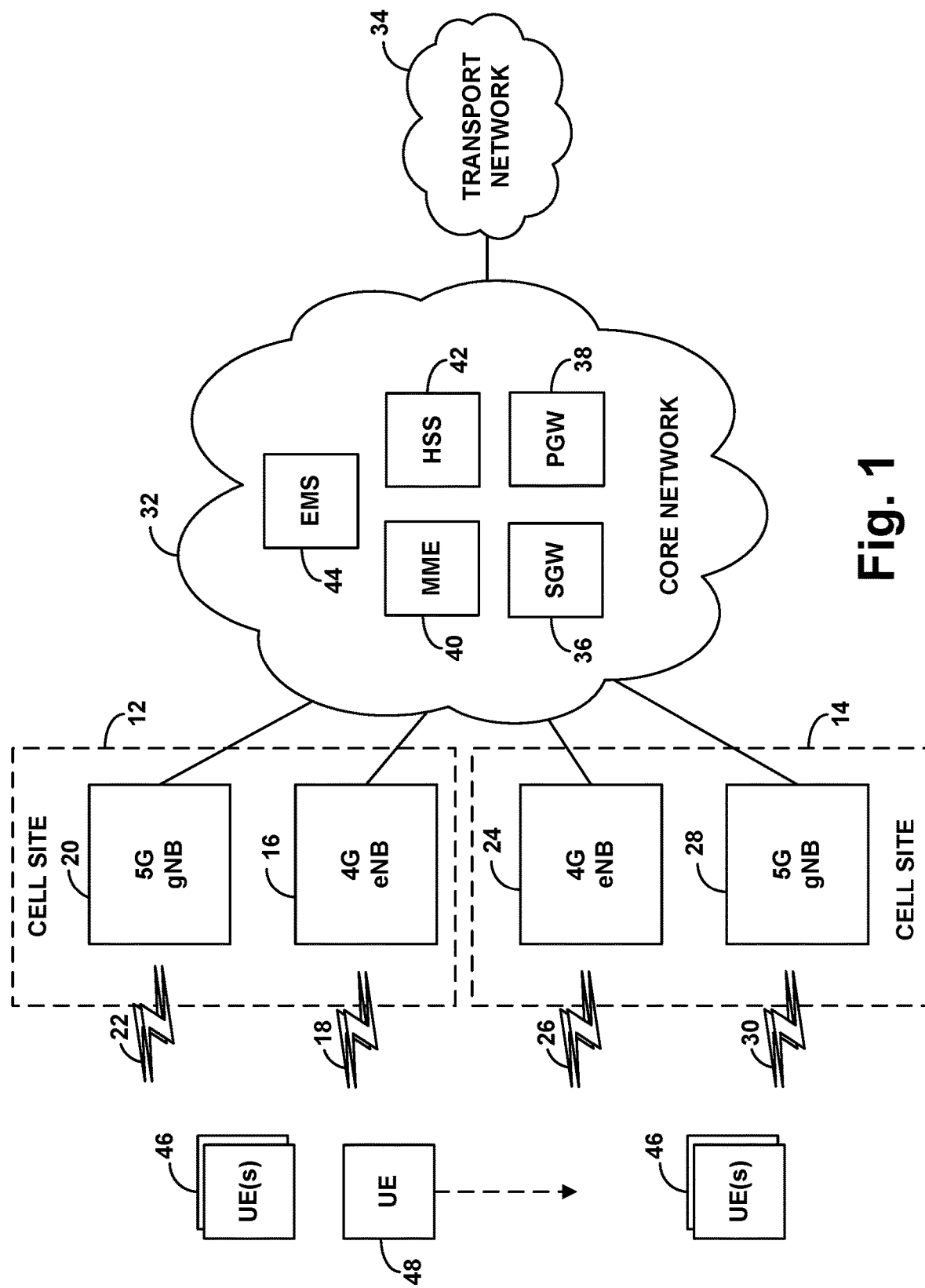
FIG. 1 is a simplified block diagram of an example wireless network arrangement in which various disclosed features can be implemented.

FIG. 1 depicts an example network arrangement including two cell sites 12, 14 that provide overlapping coverage so as to enable handover of a UE from one cell site to the other. Cell site 12 is shown including a 4G eNB 16 configured to provide one or more 4G cells 18 and a 5G gNB 20 configured to provide one or more 5G cells 22. And cell site 14 is shown including a 4G eNB 24 configured to provide one or more 4G cells 26 and a 5G gNB 28 configured to provide one or more 5G cells 30. In each cell site, the illustrated access nodes could be collocated with each other (e.g., sharing a common antenna tower and other equipment) and could provide coverage with similar direction and geographic scope as each other, to enable the two access nodes to cooperatively provide UEs with dual-connectivity service.

Each of these access nodes could take various forms. For instance, an access node could be a macro access node of the type that would typically include a tower mounted antenna structure for providing a broad range of coverage. Or an access node could be a small cell access node, femtocell access node, or other type of access node that might have a smaller form factor with an antenna structure that provides a narrower range of coverage.

The air interface of each of these cells could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Air-interface structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

Each of the access nodes is further shown interfaced with at least one core network 32. A representative core network 32 could be an evolved packet core (EPC) network, a next generation core (NGC) network, or another network and could provide connectivity with at least one transport network 34, such as the Internet. Further, the core network 32 could be a packet-switched network, compliant with the industry standard system architecture evolution (SAE) or another protocol, and thus various entities that communicate on the core network could each have an assigned Internet Protocol (IP) address and be configured to communicate with each other over packet-based tunnels or other communication interfaces.

In a representative implementation, each of the illustrated access nodes could be interfaced with an EPC network that functions as a legacy 4G core network, so that each cell site can support standalone-4G service provided by the cell site's 4G eNBs and can provide EN-DC service provided cooperatively by the cell site's 4G eNB and 5G gNB. Further, each cell site's 5G gNB could also be interfaced with an NGC network functioning as a 5G core network, to facilitate providing standalone 5G NR service. For simplicity, FIG. 1 depicts just an EPC network.

In the example shown, the core network 32 includes a serving gateway (SGW) 36, a packet data network gateway (PGW) 38, a mobility management entity (MME) 40, a home subscriber server (HSS) 42, and an element management system (EMS) 44.

With this arrangement, each access node could have an interface with the SGW 36, the SGW 36 could have an interface with the PGW 38, and the PGW 38 could provide connectivity with the transport network 34. In addition, the 4G eNB of each cell site could have an interface with the MME 40, the MME 40 could have an interface with the SGW 36, and the 4G eNBs could have an interface with each other, so that the MME 40 could coordinate setup of bearers for UEs to enable the UEs to engage in packet-data communication via 4G and 5G and so that the 4G eNBs can coordinate handover of UEs.

Still further, the HSS 42 could store or have access to UE profile records, which could specify service-subscription plans, UE configurations, and/or other such UE capability information, such as whether a UE is EN-DC capable for instance. And the EMS 44 could operate as a central repository of operational data for the wireless communication network and to control and manage operation of various network elements such as the access nodes.

FIG. 1 also illustrates a number of example UEs 46 that may from time to time be within coverage of the example cell sites 12, 14 and may be served by the example cell sites with 4G LTE service, 5G NR service, and/or EN-DC service. Further, the figure illustrates an example UE 48 in particular that may be served with EN-DC by cell site 12 and may be moving or otherwise transitioning from coverage of cell site 12 to coverage of cell site 14. Each of these UEs could take any of the forms noted above, among other possibilities. Further, each of the UEs could be equipped with a 4G LTE radio, a 5G NR radio, and associated circuitry and logic that enables the UEs to engage in 4G LTE service, 5G NR service, and EN-DC service.

In line with the discussion above, when such a UE initially enters into coverage of a given such cell site, the UE could initially discover coverage of a 4G cell of the cell site and could determine that a reference signal of that cell is strong enough to justify connecting. The UE could then engage in random-access signaling and RRC signaling with the 4G eNB of the cell site to establish a 4G connection with the 4G eNB in that 4G cell. Further, the UE could engage in attach signaling with the MME 40 via the 4G eNB, and the MME 40 and 4G eNB could coordinate setup for the UE of at least one user-plane bearer, which could include an S1-U tunnel between the SGW 36 and the 4G eNB, an S5 tunnel between the SGW 36 and the PGW 38, and a DRB between the 4G eNB and the UE. And still further, the 4G eNB might add one or more secondary 4G cells to the UE's 4G connection to provide the UE with 4G carrier aggregation service.

In addition, in relation to the UE's connection and/or attachment process or at another time, the 4G eNB could obtain capabilities data regarding the UE, including data indicating that the UE is EN-DC capable. For instance, the MME could obtain this data from the HSS 42 and provide the data to the 4G eNB, or the UE might report the data to the 4G eNB.

As the UE is EN-DC capable, the 4G eNB of the cell site could then work to configure EN-DC service for the UE. In line with the discussion above, this EN-DC setup process could include the 4G eNB, operating as the UE's MN (MeNB), engaging in signaling to add for the UE a secondary 5G connection with the 5G gNB of the cell site, the 5G gNB operating as the UE's SN (SgNB). For instance, the 4G eNB could transmit to the 5G gNB an SgNB-Addition request to cause the 5G gNB to allocate resources for a 5G connection for the UE on at least one 5G cell provided by the 5G gNB. And the 4G eNB could receive an SgNB-Addition-Request acknowledge message from the 5G gNB and then engage in associated RRC signaling with the UE, in response to which the UE could then engage in signaling with the 5G gNB to complete establishment of the 5G connection. Further, the process could also include the 4G eNB engaging in signaling such as described above to transfer to the UE's access bearer to the 5G gNB or otherwise to establish a split bearer for the UE. And the UE's 5G connection could also be structured to include multiple 5G cells for 5G carrier-aggregation service.

The cell site's 4G eNB and 5G gNB could then provide the UE with EN-DC service, concurrently serving the UE over their respective connections with the UE, each serving the UE in the manner noted above—such as learning of the UE's channel quality to establish an applicable MCS, scheduling PRB allocation for air-interface communication with the UE, and so forth.

In addition, various UEs 46 may from time to time acquire standalone 5G connectivity with either cell site's 5G gNB. This connection process may be similar to that described above. Though the standalone 5G service might use the 5G core, to facilitate advanced 5G service features for instance. Once a UE has acquired standalone 5G connectivity with a 5G gNB and has attached with an applicable core network for 5G service, the 5G gNB could then provide the UE with 5G service also in the manner noted above, likewise learning of the UE's channel quality to establish an appropriate MCS, scheduling PRB allocation for air-interface communication with the UE, and so forth.

As each 5G gNB serves UEs with standalone 5G service and/or as part of EN-DC service (among other possibilities) respectively in each of the 5G gNB's one or more cells, the 5G gNB may have a level of spectral efficiency for its service in that 5G cell. Further, the 5G gNB may have an aggregate level of spectral efficiency for its service across its 5G cells. As noted above, the spectral efficiency could be measured as bits per second per Hertz and would therefore be higher if or when the 5G gNB tends to provide higher data rate per unit of frequency spectrum, and lower if or when the 5G gNB tends to provide lower data rate per unit of frequency spectrum. Further, this analysis could be done with respect to downlink and/or uplink service.

In practice, each cell site's 5G gNB could programmatically track its level of spectral efficiency respectively of each of its one or more 5G cells and/or in the aggregate, and could report this spectral efficiency data to the cell site's 4G eNB and/or to one or more other entities such as the EMS 44 for instance. Further, each cell site's 4G eNB could report the spectral efficiency data of the cell site's 5G gNB to the other cell site's 4G eNB for storage in 4G eNB neighbor data or the like, and/or could likewise report that spectral efficiency data to one or more other entities such as the EMS 44 for instance.

The spectral efficiency data respectively for each 5G cell on which 5G gNB provides service and/or for the 5G gNB generally could be tracked on average over a sliding window of time, so as to indicate a most recent representative spectral efficiency. Alternatively or additionally, such spectral efficiency data could be tracked on a per time of day basis, to facilitate a prediction of likely spectral efficiency at a given time of day based on what the spectral efficiency has been historically on past days at the same time of day. Further, the spectral efficiency data could be recorded in correlation with an identify of the 5G gNB and its cell or cells, among other possibilities.

As noted above, the arrangement of FIG. 1 assumes that UE 48 is currently served with EN-DC by the 4G eNB 16 and 5G gNB 18 of cell site 12 and is moving or otherwise transitioning from coverage of cell site 12 to coverage of cell site 14. To facilitate possible handover of the UE from 4G eNB 16 to 4G eNB 24 in this arrangement, the UE's serving 4G eNB 16 could provision the UE to report when the UE's coverage strength from the 4G eNB 16 and/or target 4G eNB 24 reaches certain threshold levels. The 4G eNB 16 could so provision the UE by transmitting to the UE one or more RRC messages carrying measurement objects that specify what to measure and what measurement thresholds to apply, as a trigger for the UE reporting to the 4G eNB 16.

For instance, 4G eNB 16 could first provision the UE with an "A2" measurement object that causes the UE to provide a measurement report when the UE detects that the UE's coverage strength from the 4G eNB 16 is threshold low. Further, the 4G eNB 16 could provision the UE with an "A3" measurement object respectively for each of one or more cells of 4G eNB 24, to cause the UE to provide a measurement report when the UE detects that the UE's coverage strength from such a target cell of 4G eNB 24 is stronger than the UE's coverage strength from 4G eNB 16 by a specified A4 measurement threshold offset. And/or the 4G eNB 16 could provision the UE with an "A4" measurement object respectively for each of one or more cells of 4G eNB 24, to cause the UE to provide a measurement report when the UE detects that the UE's coverage strength from such a target cell of 4G eNB 24 is at least as high as a specified A4 measurement threshold. These or other such measurement thresholds could be reference signal thresholds, such reference signal receive strength (RSRP) or reference signal receive quality (RSRP), or could take other forms.

Note also that specification of a measurement threshold could also involve specifying a measurement-bias value that the UE is to apply when measuring coverage strength. For instance, the 4G eNB 16 might specify a particular measurement threshold and also a measurement-bias value that will cause the UE to adjust downward or upward the coverage strength that the UE actually measures for purposes of then comparing with the specified threshold to determine whether to provide a measurement report. Therefore, reference herein to adjusting, setting, specifying, or providing a measurement threshold could just a well relate to providing such a measurement-bias value.

Applying these or other such measurement thresholds, the UE may thus report to its serving 4G eNB 16 when the UE detects that the UE is within threshold strong (e.g., threshold stronger) coverage of one or more cells of 4G eNB 24. And in response, the 4G eNB 16 could then process 4G handover of the UE from being connected with 4G eNB 16 to instead being connected with 4G eNB 24.

In line with the discussion above, this handover process for the EN-DC-connected UE could involve the 4G eNB 16 de-configuring the UE's EN-DC such as by reversing the EN-DC setup process, to de-configure any split bearer that was established for the UE and to release the UE's 5G connection with 5G gNB 20, thus transitioning the UE to standalone 4G service provided by the 4G eNB 16. Further, the 4G eNB 16 could engage in handover signaling with the target 4G eNB 24, such as transmitting a handover request to the target 4G eNB 24 to prepare the target 4G eNB 24 to serve the UE and receiving a handover response from the 4G eNB 24, and could direct and thus cause the UE to switch to being connected with the 4G eNB 24. And once the UE thereby connects with 4G eNB 24, the 4G eNB 24, as the UE's new MN, could then configure EN-DC service for the UE in cell site 14, adding for the UE a secondary 5G connection with 5G gNB 28 on one or more carriers on which 5G gNB 28 operates, and perhaps coordinating setup of a split bearer so that 4G eNB 24 and 5G gNB 28 could then cooperatively provide the UE with EN-DC service.

In line with the discussion above, per the present disclosure, the UE's serving 4G eNB 16 could take into consideration the spectral efficiency data of both the 5G gNB 20 and the 5G gNB 28 as a basis to control this handover process. By way of example, when the 4G eNB 16 will provide the UE with a measurement object that specifies a measurement threshold that could trigger measurement reporting by the UE and handover of the UE from 4G eNB 16 to 4G eNB 24, the 4G eNB 16 could adjust or otherwise set that measurement threshold based on the 5G spectral efficiency comparison, to either deter or foster the 4G handover.

In practice, for instance, the 4G eNB 16 could determine spectral efficiency of the UE's currently serving 5G gNB 20 and spectral efficiency of the 5G gNB 28 that would likely become the UE's SN for EN-DC service if the UE were to hand over from 4G eNB 16 to 4G eNB 24. The spectral efficiency of the UE's currently serving 5G gNB 20 could be spectral efficiency in aggregate for the one or more 5G cells 22 on which the UE is secondarily connected with 5G gNB 20. And the spectral efficiency of 5G gNB 28 could be spectral efficiency in aggregate for the one or more 5G cells 30 on which the UE could potentially become secondarily connected with the 5G gNB 20. Alternatively, subsets of such cells could be considered.

The 4G eNB 16 could obtain this spectral efficiency data from records established by the respective 5G gNBs, among other possibilities. For instance, the 4G eNB 16 could query the 5G gNB 20, the 4G eNB 24, and/or the EMS 44, to request and obtain this data or could obtain the data from a neighbor list, among other possibilities. In a non-limiting example implementation, the 4G eNB 16 could thus obtain one representative spectral-efficiency measure as to service of 5G gNB 20 and one other representative spectral-efficiency measure as to service of 5G gNB 28.

The 4G eNB 16 could then compare these 5G spectral efficiency measures and, though this comparison could determine whether one of the measures is threshold higher than the other, i.e., whether one of the measures is at least as much as a predefined threshold greater than the other. The predefined threshold here could be set by engineering design. By way of example, the predefined threshold could be a value such as 5 bits/second/Hz or greater.

And based on this comparison of the 5G spectral efficiency measures, the 4G eNB 16 could then adjust or otherwise set one or more 4G measurement thresholds that the 4G eNB 16 will provide to the UE for the UE's use in evaluating 4G coverage of the 4G eNB 24.

For example, if the 4G eNB 16 determines that spectral efficiency of UE's currently serving 5G gNB 20 is sufficiently higher than spectral efficiency of the 5G gNB 28 that would likely become the UE's SN for EN-DC service upon handover of the UE to 4G eNB 24, the 4G eNB 16 might set each of one or more such measurement thresholds to a value that helps to deter the UE handing over from 4G eNB 16 to 4G eNB (e.g., to helping to delay such handover until more necessary from a coverage strength perspective)—to help keep the UE secondarily connected with the 5G gNB 20 that has the sufficiently higher spectral efficiency.

Whereas, if the 4G eNB 16 determines that spectral efficiency of the UE's currently serving 5G gNB 20 is sufficiently lower than spectral efficiency of the 5G gNB 28 that would likely become the UE's SN for EN-DC service upon handover of the UE to 4G eNB 24, the 4G eNB 16 might set each of one or more such measurement thresholds to a value that helps to foster the UE handing over from 4G eNB 16 to 4G eNB—to help facilitate the UE ultimately being secondarily connected with the 5G gNB 28 that has the sufficiently higher spectral efficiency.

As a specific example of this, without limitation, the 4G eNB 16 might be configured by default to specify as an A4 threshold for measuring coverage of 4G eNB 24 an RSRP value of −102 decibel milliwatts (dBm). But if the 4G eNB 16 determines that the spectral efficiency measure of 5G gNB 20 is threshold higher than the spectral efficiency measure of 5G gNB 28, the 4G eNB 16 might instead specify as the A4 threshold a higher RSRP value such as −108 dBm, to help deter the handover. And if the 4G eNB 16 determines that the spectral efficiency measure of 5G gNB 20 is threshold lower than the spectral efficiency measure of 5G gNB 28, the 4G eNB 16 might instead specify as the A4 threshold a lower RSRP value such as −112 dBm, to help foster the handover.

Likewise, the 4G eNB 16 might adjust or set an A3 measurement-offset value for the UE to compare coverage strength of the target 4G eNB 24 with coverage strength of 4G eNB 16. For instance, the 4G eNB 16 might set a relatively low measurement-offset value if the spectral efficiency of 5G gNB 28 is threshold higher than the spectral efficiency of 5G gNB 20, or the 4G eNB 16 might set a relatively high measurement-offset value if the spectral efficiency of the 5G gNB 28 is threshold lower than the spectral efficiency of the 5G gNB 20.

Further, the 4 eNB 16 could adjust or otherwise set these or other such measurement thresholds to a level based on how much higher or lower one 5G gNB's spectral efficiency measure is than the other 5G gNB's. For instance, if the 4G eNB 16 computes that the spectral efficiency measure of 5G gNB 28 is higher than the spectral efficiency measure of 5G 20 by a positive delta value D, the higher that value D is, the lower the 4G eNB 16 may set an A4 measurement threshold to help foster UE handover to 4G eNB 24.

Figure 2:
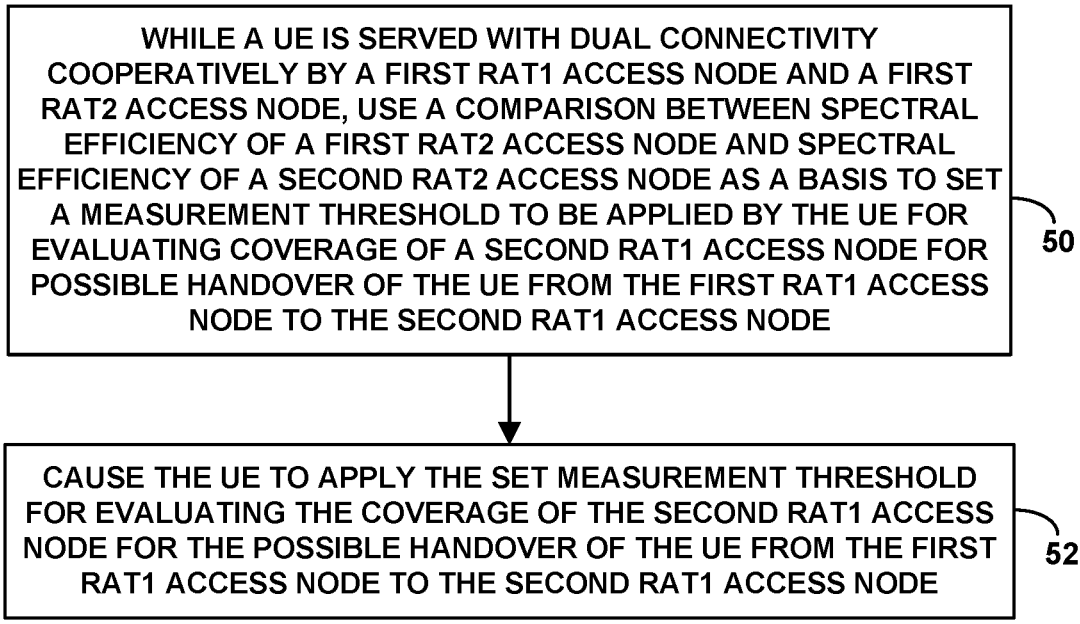
FIG. 2 is a flow chart depicting an example method in accordance with the disclosure.

FIG. 2 is next a flow chart depicting a method that can be carried out in accordance with the present disclosure to control handover of a UE in a wireless communication system including access nodes that provide service according to a first radio access technology (RAT1) (RAT1 access nodes) and access nodes that provide service according to a second radio access technology (RAT2) (RAT2 access nodes).

As shown in FIG. 2, at block 50, the method includes, while the UE is served with dual connectivity cooperatively by a first RAT1 access node and a first RAT2 access node, using a comparison between spectral efficiency of the first RAT2 access node and spectral efficiency of the second RAT2 access node as a basis to set a measurement threshold to be applied by the UE for evaluating coverage of a second RAT1 access node for possible handover of the UE from the first RAT1 access node to the second RAT1 access node. And at block 52, the method includes causing the UE to apply the set measurement threshold for evaluating the coverage of the second RAT1 access node for the possible handover of the UE from the first RAT1 access node to the second RAT1 access node.

In line with the discussion above, this method could be carried out by a computing system at the first RAT1 access node, in which case causing the UE to apply the set measurement threshold could involve transmitting to the UE an RRC message providing the UE with a measurement object that specifies the measurement threshold, to which the UE may be configured to respond to so applying the threshold. Alternatively, the method could be carried out by another entity, such as by an external computing system, in which case causing the UE to apply the set measurement threshold could involve signaling to the first RAT1 access node to cause the first RAT1 access node to similarly message to the UE. Still alternatively, if the UE has access to spectral efficiency data, the UE might itself carry out the method.

As further discussed above, the act of using the comparison between spectral efficiency of the first RAT2 access node and spectral efficiency of the second RAT2 access node as a basis to set a measurement threshold could involve (i) determining spectral efficiency of the first RAT2 access node, (ii) determining spectral efficiency of the second RAT2 access node, (iii) performing the comparison between the determined spectral efficiency of the first RAT2 access node and the determined spectral efficiency of the second RAT2 access node, and (iv) based on the performed comparison, setting the measurement threshold. And the acts of determining the spectral efficiency of the first RAT2 access node and determining the spectral efficiency of the second RAT2 access node could be based on spectral-efficiency data records.

Further, the UE being served with the dual connectivity cooperatively by the first RAT1 access node and the first RAT2 access node could include the UE being concurrently connected with and served by (i) the first RAT1 access node over a RAT1 connection between the UE and the first RAT1 access node and (ii) the first RAT2 access node over a RAT2 connection between the UE and the first RAT2 access node. And the RAT2 connection could be on one or more carriers on which the first RAT2 access node provides service, and the act of determining the spectral efficiency of the first RAT2 access node could involve determining the spectral efficiency of the first RAT2 access node as to the one or more carriers.

In addition, the second RAT2 access node could provide service on one or more carriers, and the act of determining the spectral efficiency of the second RAT2 access node could involve determining the spectral efficiency of the second RAT2 access node as to at least one of the one or more carriers.

Still further, the act of setting the measurement threshold based on the performed comparison could involve (i) making a determination, based on the comparison, of whether the spectral efficiency of the second RAT2 access node is threshold higher than the determined spectral efficiency of the first RAT2 access node, (ii) if the determination is affirmative, then, based at least in part on the determination, setting the measurement threshold to a first value, and (iii) if the determination is negative, then, based at least in part on the determination, setting the measurement threshold to a second value different than the first value.

In this context, for instance, the measurement threshold could comprise an A4 threshold defining a minimum coverage strength of the second RAT1 access node sufficient to trigger measurement reporting to the first RAT1 access node for possible handover of the UE from the first RAT1 access node to the second RAT1 access node, and the first value could be lower than the second value. Or the measurement threshold could comprise an A3 measurement-offset threshold defining how much stronger coverage of the second RAT1 access node is than coverage of the first RAT1 access node to trigger measurement reporting to the first RAT1 access node for possible handover of the UE from the first RAT1 access node to the second RAT1 access node, and the first value could likewise be lower than the second value.

Further, as discussed above, the act of setting the measurement threshold based on the performed comparison could involve (i) making a determination, based on the comparison, of whether the spectral efficiency of the second RAT2 access node is threshold lower than the determined spectral efficiency of the first RAT2 access node, (ii) if the determination is affirmative, then, based at least in part on the determination, setting the measurement threshold to a first value, and (iii) if the determination is negative, then, based at least in part on the determination, setting the measurement threshold to a second value different than the first value.

And still further, as discussed above, the act of setting the measurement threshold based on the performed comparison could involve (i) determining a difference between the determined spectral efficiency of the first RAT2 access node and the second RAT2 access node and (ii) using the determined difference as a basis to set the measurement threshold. And yet further, as noted above, the act of setting the measurement value could involve setting a bias value used for measurement.

Yet further, as discussed above, this method could be carried out with respect to various RATs and various forms of dual connectivity By way of example, RAT1 could be 4G LTE, RAT2 could be 5G NR, and the dual connectivity could be EN-DC.

Figure 3:
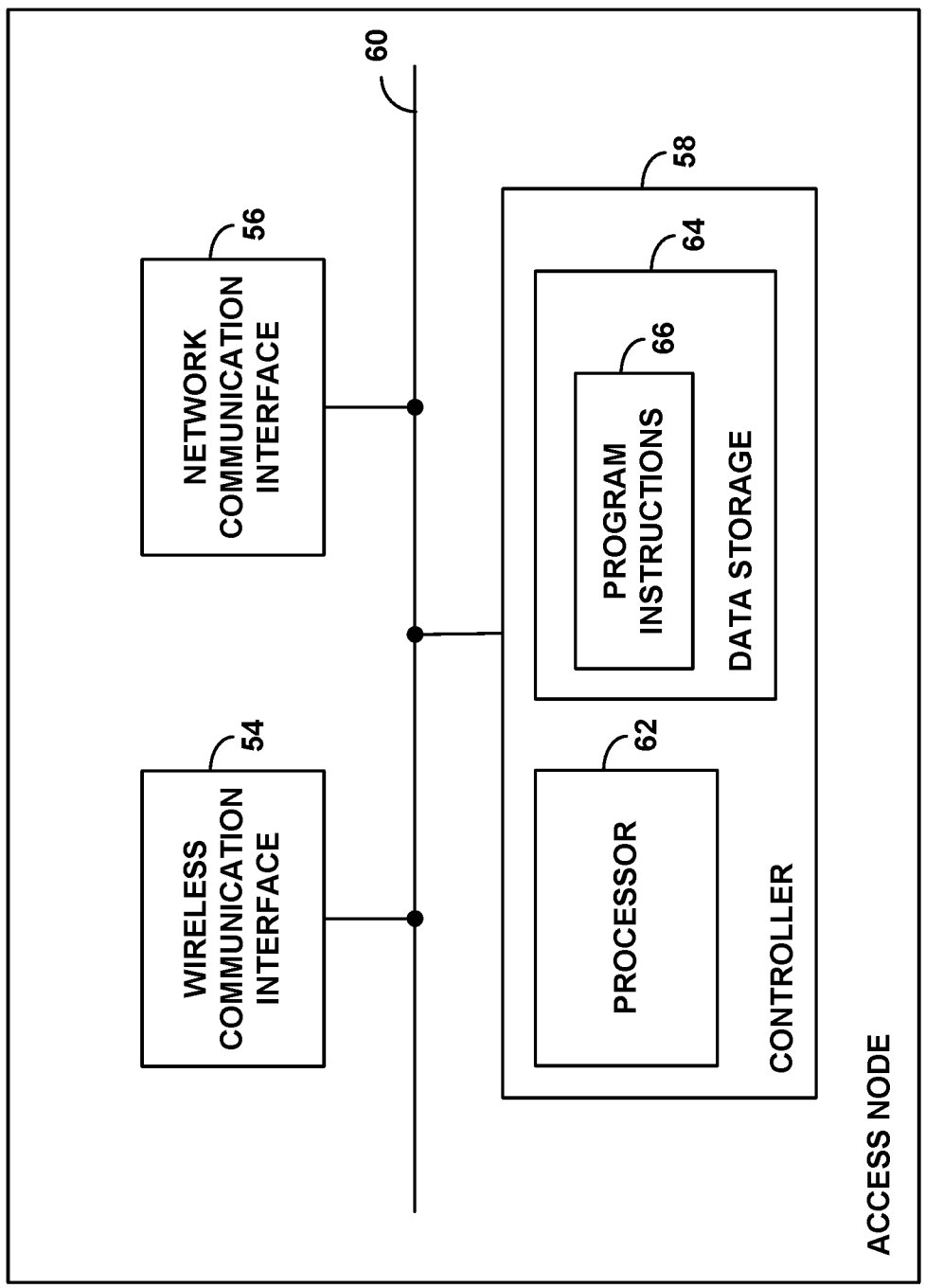
FIG. 3 is a simplified block diagram of an example access node operable in accordance with the disclosure.

FIG. 3 is next a simplified block diagram of an example access node that could carry out operations as described herein. This access node could represent the first RAT1 access node in the method described above, among other possibilities.

As shown in FIG. 3, the example access node includes a wireless communication interface 54, a network communication interface 56, and a controller 58, which could be integrated together and/or communicatively linked together by a system bus, network, or other connection mechanism 60.

In an example implementation, the wireless communication interface 54 could comprise an antenna structure, which could be tower mounted or could take other forms, and associated components such as a power amplifier and a wireless transceiver, so as to facilitate providing a cell defining an air interface and engaging air-interface communication on the air interface in accordance with an applicable RAT such as RAT1. And the network communication interface 56 could comprise a physical network connector (e.g., an Ethernet interface) and associated communication logic (e.g., protocol stacks) to facilitate wired or wireless network communication with various other entities, such as with other access nodes and various core-network entities.

Further, the controller 58 (which might be provided by a baseband unit of the access node, for instance) could comprise a processor (e.g., one or more general purpose processors (e.g., microprocessors) and/or specialized processors (e.g., application specific integrated circuits)), non-transitory data storage (e.g., one or more volatile and/or non-volatile storage components (such as magnetic, optical, or flash storage), necessarily non-transitory), and program instructions stored in the non-transitory data storage and executable by processor to carry out various operations such as those discussed herein, including for example the operations discussed above in relation to FIG. 2.

Various other features discussed herein can be implemented in this context as well, and vice versa.

Figure 4:
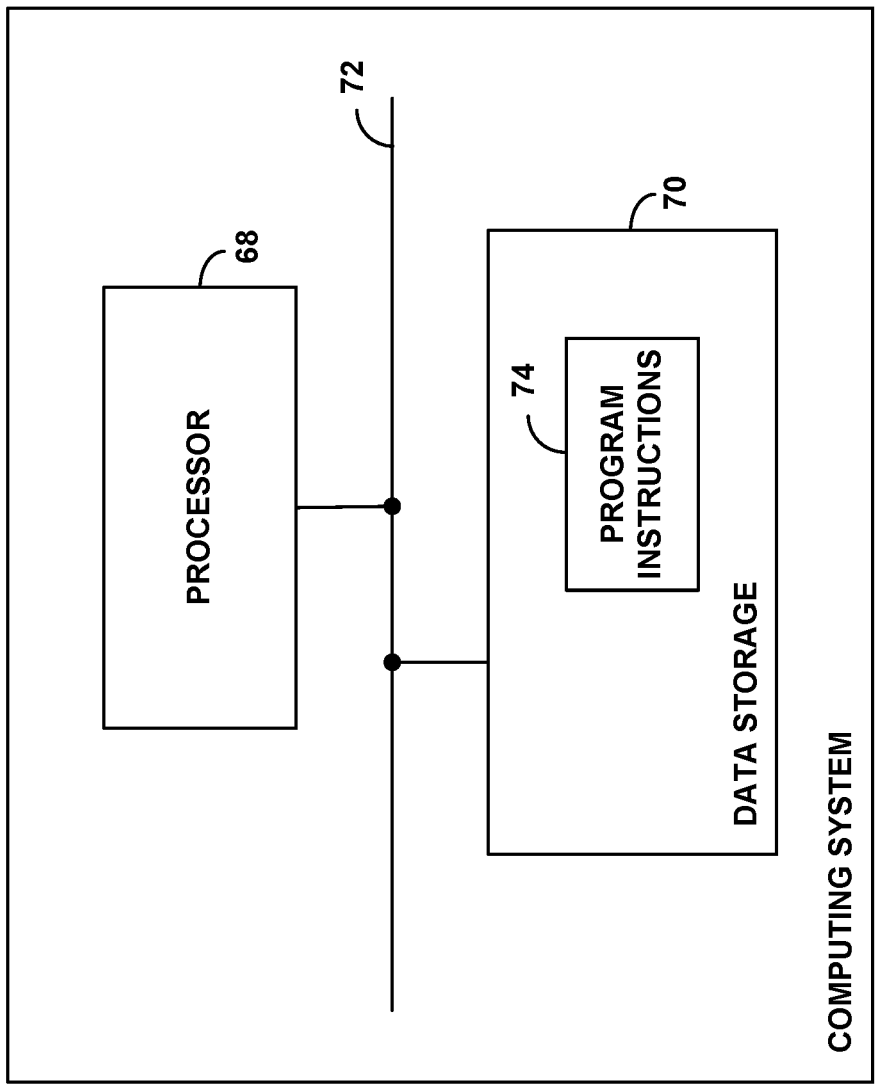
FIG. 4 is a simplified block diagram of an example computing system operable in accordance with the disclosure.

FIG. 4 is next a simplified block diagram of an example computing system that could be operable in accordance with the present disclosure. As noted above, such a computing system could be provided at the first RAT1 access node and/or at one or more other locations.

As shown in FIG. 4, the example computing system includes a network communication interface 62, a processing unit 64, and non-transitory data storage 66, which could be integrated together and/or interconnected by a system bus, network, or other connection mechanism 68.

The network communication interface 62 could comprise a physical network connector (e.g., an Ethernet interface) and associated communication logic (e.g., protocol stacks) to facilitate wired or wireless network communication with various other entities. The processor 64 could comprise a processor (e.g., one or more general purpose processors (e.g., microprocessors) and/or specialized processors (e.g., application specific integrated circuits)). And the non-transitory data storage 66 could comprise one or more volatile and/or non-volatile storage components (e.g., magnetic, optical, or flash storage, necessarily non-transitory).

As shown, the data storage 66 could then store program instructions 70, which could be executable by the processor 64 to cause the computing system to carry out various operations described herein, to control handover of a UE in a wireless communication system including RAT1 access nodes and RAT2 access nodes. For instance, the operations could include those discussed above in relation to FIG. 2.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling handover of a user equipment device (UE) in a wireless communication system including access nodes that provide service according to a first radio access technology (RAT1) (RAT1 access nodes) and access nodes that provide service according to a second radio access technology (RAT2) (RAT2 access nodes), the method comprising:

while the UE is served with dual connectivity cooperatively by a first RAT1 access node and a first RAT2 access node, using a comparison between spectral efficiency of the first RAT2 access node and spectral efficiency of a second RAT2 access node as a basis to set a measurement threshold to be applied by the UE for evaluating coverage of a second RAT1 access node for possible handover of the UE from the first RAT1 access node to the second RAT1 access node; and causing the UE to apply the set measurement threshold for evaluating the coverage of the second RAT1 access node for the possible handover of the UE from the first RAT1 access node to the second RAT1 access node.

2. The method of claim 1, wherein using the comparison between spectral efficiency of the first RAT2 access node and spectral efficiency of the second RAT2 access node as a basis to set a measurement threshold comprises:

determining spectral efficiency of the first RAT2 access node;

determining spectral efficiency of the second RAT2 access node;

performing the comparison between the determined spectral efficiency of the first RAT2 access node and the determined spectral efficiency of the second RAT2 access node; and based on the performed comparison, setting the measurement threshold.

3. The method of claim 2, wherein the UE being served with the dual connectivity cooperatively by the first RAT1 access node and the first RAT2 access node includes the UE being concurrently connected with and served by (i) the first RAT1 access node over a RAT1 connection between the UE and the first RAT1 access node and (ii) the first RAT2 access node over a RAT2 connection between the UE and the first RAT2 access node.

4. The method of claim 3, wherein the RAT2 connection is on one or more carriers on which the first RAT2 access node provides service, and wherein determining the spectral efficiency of the first RAT2 access node comprises determining the spectral efficiency of the first RAT2 access node as to the one or more carriers.

5. The method of claim 2, wherein the second RAT2 access node provides service on one or more carriers, and wherein determining the spectral efficiency of the second RAT2 access node comprises determining the spectral efficiency of the second RAT2 access node as to at least one of the one or more carriers.

6. The method of claim 2, wherein determining the spectral efficiency of the first RAT2 access node and determining the spectral efficiency of the second RAT2 access node are based on spectral-efficiency data records.

7. The method of claim 2, wherein setting the measurement threshold based on the performed comparison comprises:

making a determination, based on the comparison, of whether the spectral efficiency of the second RAT2 access node is threshold higher than the determined spectral efficiency of the first RAT2 access node;

if the determination is affirmative, then, based at least in part on the determination, setting the measurement threshold to a first value; and if the determination is negative, then, based at least in part on the determination, setting the measurement threshold to a second value different than the first value.

8. The method of claim 7, wherein the measurement threshold comprises an A4 threshold defining a minimum coverage strength of the second RAT1 access node sufficient to trigger measurement reporting to the first RAT1 access node for possible handover of the UE from the first RAT1 access node to the second RAT1 access node; and wherein the first value is lower than the second value.

9. The method of claim 7, wherein the measurement threshold comprises an A3 measurement-offset threshold defining how much stronger coverage of the second RAT1 access node is than coverage of the first RAT1 access node to trigger measurement reporting to the first RAT1 access node for possible handover of the UE from the first RAT1 access node to the second RAT1 access node; and wherein the first value is lower than the second value.

10. The method of claim 2, wherein setting the measurement threshold based on the performed comparison comprises:

making a determination, based on the comparison, of whether the spectral efficiency of the second RAT2 access node is threshold lower than the determined spectral efficiency of the first RAT2 access node;

if the determination is affirmative, then, based at least in part on the determination, setting the measurement threshold to a first value; and if the determination is negative, then, based at least in part on the determination, setting the measurement threshold to a second value different than the first value.

11. The method of claim 2, wherein setting the measurement threshold based on the performed comparison comprises:

determining a difference between the determined spectral efficiency of the first RAT2 access node and the second RAT2 access node; and using the determined difference as a basis to set the measurement threshold.

12. The method of claim 1, wherein the method is carried out by the first RAT1 access node.

13. The method of claim 1, wherein RAT1 is 4G Long Term Evolution (4G LTE), RAT2 is 5G New Radio (5G NR), and the dual connectivity is EUTRA-NR Dual Connectivity (EN-DC).

14. The method of claim 1, wherein setting the measurement value comprises setting a bias value used for measurement.

15. In a wireless communication system including access nodes that provide service according to a first radio access technology (RAT1) (RAT1 access nodes) and access nodes that provide service according to a second radio access technology (RAT2) (RAT2 access nodes), a first RAT1 access node configured to control handover of a user equipment device (UE), the first RAT1 access node comprising:

a wireless communication interface through which the first RAT1 access node is configured to provide the service according to RAT1;

a network communication interface though which the first RAT1 access node is configured to engage in network communication with other entities; and a controller configured to carry out operations including:

while the UE is served with dual connectivity cooperatively by the first RAT1 access node and a first RAT2 access node, using a comparison between spectral efficiency of the first RAT2 access node and spectral efficiency of a second RAT2 access node as a basis to set a measurement threshold to be applied by the UE for evaluating coverage of a second RAT1 access node for possible handover of the UE from the first RAT1 access node to the second RAT1 access node, and causing the UE to apply the set measurement threshold for evaluating the coverage of the second RAT1 access node for the possible handover of the UE from the first RAT1 access node to the second RAT1 access node.

16. The first RAT1 access node of claim 15, wherein the controller comprises a processor, non-transitory data storage, and program instructions stored in the non-transitory data storage and executable by the processor to carry out the operations.

17. The first RAT1 access node of claim 15, wherein using the comparison between spectral efficiency of the first RAT2 access node and spectral efficiency of the second RAT2 access node as a basis to set a measurement threshold comprises:
determining spectral efficiency of the first RAT2 access node;
determining spectral efficiency of the second RAT2 access node;
performing the comparison between the determined spectral efficiency of the first RAT2 access node and the determined spectral efficiency of the second RAT2 access node; and
based on the performed comparison, setting the measurement threshold.

18. The first RAT1 access node of claim 17,
wherein the UE being served with the dual connectivity cooperatively by the first RAT1 access node and the first RAT2 access node includes the UE being concurrently connected with and served by (i) the first RAT1 access node over a RAT1 connection between the UE and the first RAT1 access node and (ii) the first RAT2 access node over a RAT2 connection between the UE and the first RAT2 access node,
wherein the RAT2 connection is on one or more carriers on which the first RAT2 access node provides service, and
wherein determining the spectral efficiency of the first RAT2 access node comprises determining the spectral efficiency of the first RAT2 access node as to the one or more carriers.

19. The first RAT1 access node of claim 17, wherein the second RAT2 access node provides service on one or more carriers, and wherein determining the spectral efficiency of the second RAT2 access node comprises determining the spectral efficiency of the second RAT2 access node as to at least one of the one or more carriers.

20. A computing system comprising:
a processor;
non-transitory data storage; and
program instructions stored in the non-transitory data storage and executable by the processor to cause the computing system to carry out operations for controlling handover of a user equipment device (UE) in a wireless communication system including access nodes that provide service according to a first radio access technology (RAT1) (RAT1 access nodes) and access nodes that provide service according to a second radio access technology (RAT2) (RAT2 access nodes), the operations including:
while the UE is served with dual connectivity cooperatively by a first RAT1 access node and a first RAT2 access node, using a comparison between spectral efficiency of the first RAT2 access node and spectral efficiency of a second RAT2 access node as a basis to set a measurement threshold to be applied by the UE for evaluating coverage of a second RAT1 access node for possible handover of the UE from the first RAT1 access node to the second RAT1 access node, and
causing the UE to apply the set measurement threshold for evaluating the coverage of the second RAT1 access node for the possible handover of the UE from the first RAT1 access node to the second RAT1 access node.

* * * * *